United States Patent
Hogan et al.

(10) Patent No.: US 9,508,158 B2
(45) Date of Patent: Nov. 29, 2016

(54) PALETTE GENERATION USING USER-SELECTED IMAGES

(71) Applicant: APPLE INC., Cupertino, CA (US)

(72) Inventors: Edward P. Hogan, Pittsburgh, PA (US); Joe R. Howard, San Jose, CA (US); Marek R. Telgarsky, Pittsburgh, PA (US); Matthew R. Lehrian, Pittsburgh, PA (US)

(73) Assignee: APPLE INC., Cupertino, CA (US)

( * ) Notice: Subject to any disclaimer, the term of this patent is extended or adjusted under 35 U.S.C. 154(b) by 84 days.

(21) Appl. No.: 14/223,206

(22) Filed: Mar. 24, 2014

(65) Prior Publication Data

US 2015/0269747 A1    Sep. 24, 2015

(51) Int. Cl.

| | | |
|---|---|---|
| *G06T 5/00* | (2006.01) | |
| *G06T 11/20* | (2006.01) | |
| *G06T 3/20* | (2006.01) | |
| *G06T 5/40* | (2006.01) | |
| *G06T 11/00* | (2006.01) | |
| *G09G 5/02* | (2006.01) | |
| *G09G 5/06* | (2006.01) | |
| *G09G 5/14* | (2006.01) | |
| *G06F 3/08* | (2006.01) | |
| *G06F 3/048* | (2013.01) | |
| *G06T 7/40* | (2006.01) | |
| *G06T 11/60* | (2006.01) | |

(52) U.S. Cl.
CPC .............. *G06T 7/408* (2013.01); *G06T 11/001* (2013.01); *G06T 11/60* (2013.01)

(58) Field of Classification Search
CPC ....... G06T 5/001; G06T 5/40; G06T 11/001; G06T 11/206; G06T 3/203; G06T 11/00; G09G 5/02; G09G 5/06; G09G 5/14; G09G 2320/0276; H04N 1/6058; H04N 1/4092; H04N 2201/0481; G06F 3/016; G06F 17/24; G06F 3/04817; G06F 3/0481; G06F 3/0482; G06F 3/0486

See application file for complete search history.

(56) References Cited

U.S. PATENT DOCUMENTS

| | | | |
|---|---|---|---|
| 5,588,108 A * | 12/1996 | Kumar | G06F 3/04845 715/765 |
| 5,598,519 A | 1/1997 | Narayanan | |
| 6,392,764 B1 | 5/2002 | Eschbach et al. | |
| 8,564,548 B2 | 10/2013 | Robin et al. | |
| 8,576,241 B1 * | 11/2013 | Kanter | G06F 17/3025 345/589 |
| 8,587,604 B1 * | 11/2013 | Kanter | G06F 17/3025 345/581 |
| 8,589,783 B2 | 11/2013 | Williamson | |
| 2006/0036513 A1 * | 2/2006 | Whatley | G06Q 30/06 705/26.1 |
| 2007/0229526 A1 * | 10/2007 | Hsu | G06F 9/4443 345/581 |
| 2009/0259567 A1 * | 10/2009 | Watts | G06Q 30/0601 705/26.1 |
| 2013/0229429 A1 | 9/2013 | Mi et al. | |
| 2014/0193047 A1 * | 7/2014 | Grosz | G06F 3/1242 382/118 |
| 2015/0170380 A1 * | 6/2015 | Duwenhorst | G06T 11/001 345/594 |

* cited by examiner

*Primary Examiner* — Wesner Sajous
(74) *Attorney, Agent, or Firm* — Fletcher Yoder PC (57) ABSTRACT

Automatic generation of custom palettes based on an image selected by a user is disclosed. In various embodiments, automatic palette generation may involve generating one or more than one palette based on the color or shading content of the image provided by the user. The generated palette may include a variety of colors (or shadings) that can be automatically mapped to and applied to various distinct features within a composite graphic construct to be customized.

20 Claims, 11 Drawing Sheets

PALETTE GENERATION USING USER-SELECTED IMAGES

BACKGROUND

The present disclosure relates generally to palette generation for use with various types of graphical objects used in applications.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Various types of applications, including spreadsheet applications, presentation applications, and word processing applications, may allow a user to generate and customize various types of graphical structures, including graphical data representations such as tables, graphs, and charts. Such graphical structures may include a wide variety of elements which it may be desirable to visually distinguish from one another. With this in mind, an application may provide a set of preset color or grayscale palettes, and the user may choose to apply a selected preset palette to a given graphical structure to differently color or shade different elements of the graphical structure.

One consequence of providing preset palette options is that such options are limited in number. As a result, due to the limited number of preset palette choices, a user may be unable to locate a suitable or satisfactory palette for a give graphical structure.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

As described herein, the present approaches relate to the automatic generation of custom palettes based on an image selected by a user. In various embodiments, this automatic generation may involve generating one or more than one palette based on the color or shading content of the image provided by the user. The generated palette may include a variety of colors (or shadings) that can be automatically mapped to and applied to various distinct features within a composite graphic construct to be customized, such as to automatically apply the palette colors to the fill, line strokes, or text of such constructs. Examples of such constructs include, but are not limited to, tables, charts, graphs, and shapes that may be used in a document and which may be constructed using multiple distinct component graphics to form the whole. In this manner, a user may assign a color scheme to a composite graphic construct that is consistent with and coherent with the selected image.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The disclosure is generally directed to allowing a user to generate color or grayscale palettes based on a user selected image. That is, in response to a user selecting or specifying an image, one or more routines may be executed that analyze the image and automatically generate one or more palettes of colors or shadings based upon the image. The palette or palettes may then be made available to the user to apply to a selected graphical representation or, if only a single image-derived palette is generated may be automatically applied to the graphical representation. In this manner, different portions of the graphical representation may be colored or shaded using a custom palette generated in response to the user input.

Figure 1:
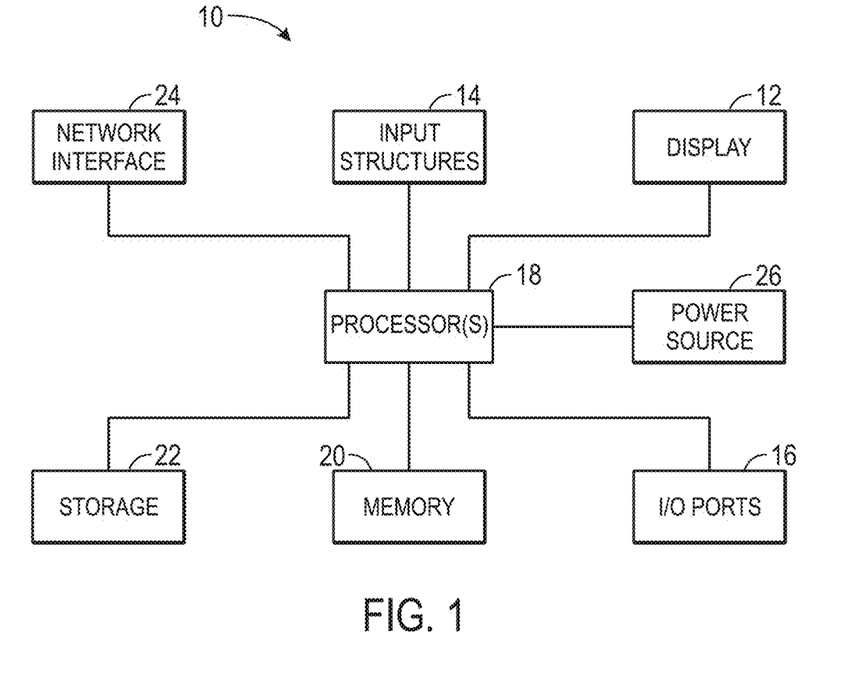
FIG. 1 is a block diagram of an electronic device that may use the techniques disclosed herein, in accordance with aspects of the present disclosure.
Figure 2:
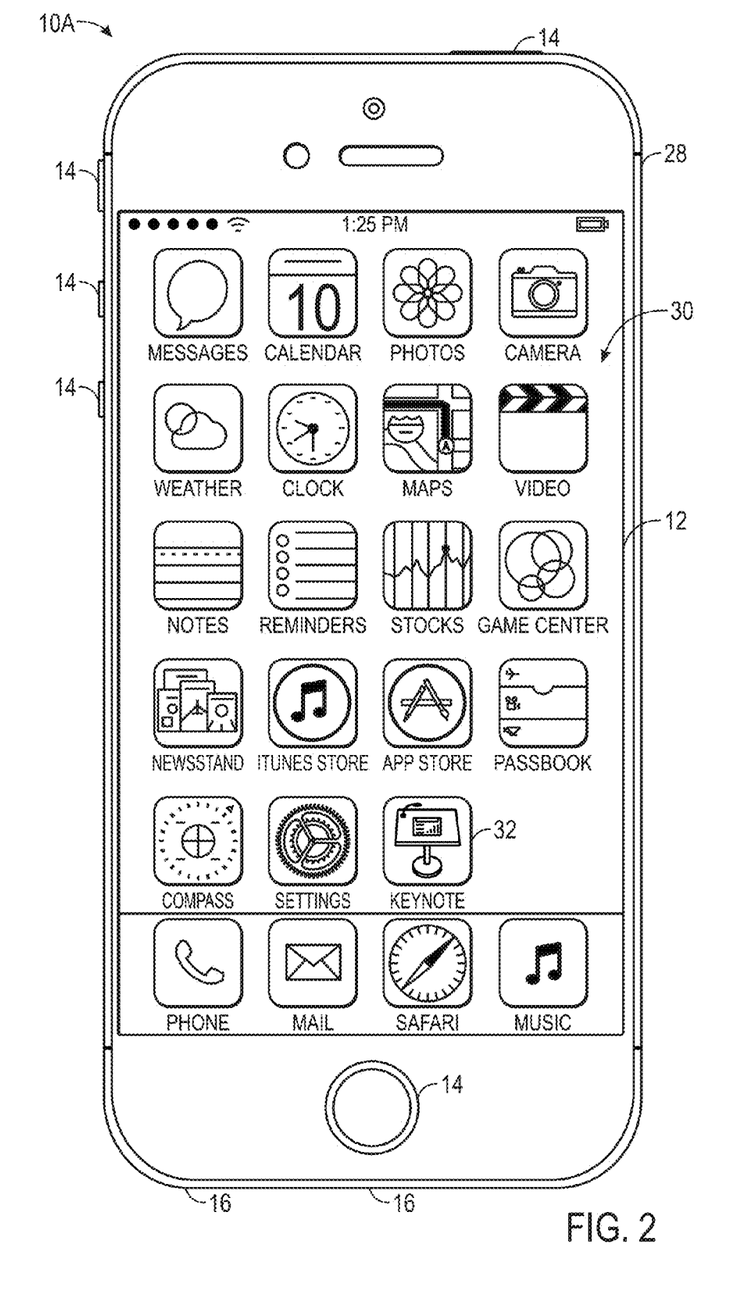
FIG. 2 is a front view of a handheld device, such as an iPhone® by Apple Inc., representing an example of the electronic device of FIG. 1.
Figure 3:
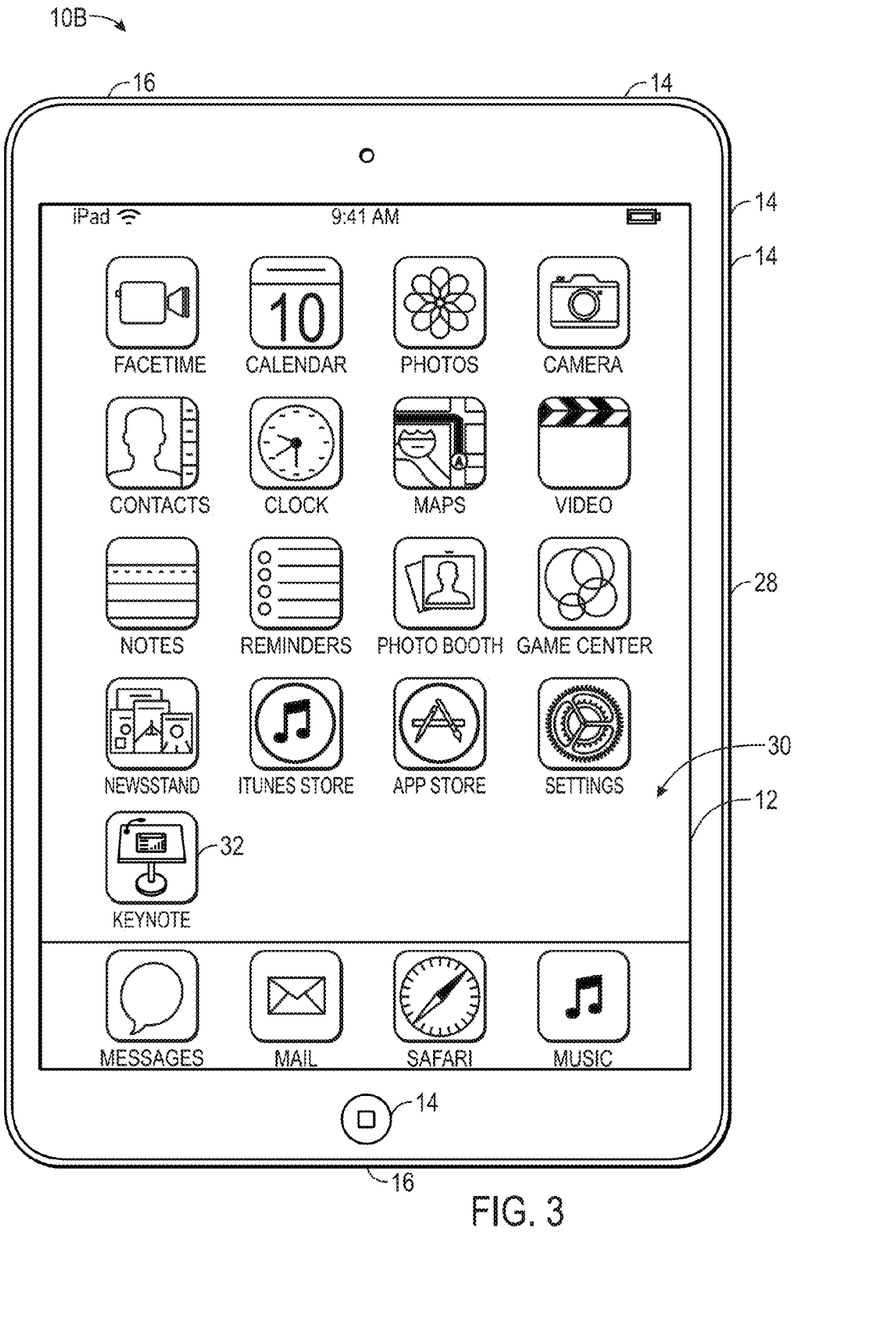
FIG. 3 is a front view of a tablet device, such as an iPad® by Apple Inc., representing an example of the electronic device of FIG. 1.
Figure 4:
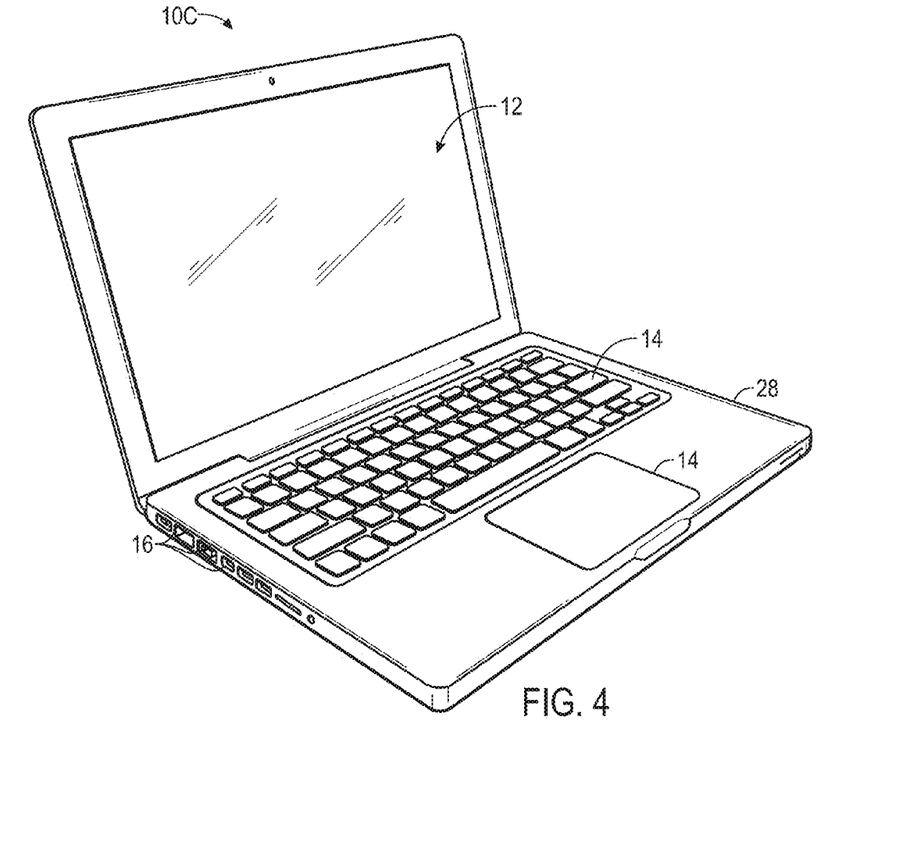
FIG. 4 is a perspective view of a notebook computer, such as a MacBook Pro® by Apple Inc., representing an example of the electronic device of FIG. 1.

A variety of suitable electronic devices may employ the techniques described herein to generate palettes based on user selected or provided images. FIG. 1, for example, is a block diagram depicting various components that may be present in a suitable electronic device 10 that may be used in the implementation of the present approaches. FIGS. 2, 3, and 4 illustrate example embodiments of the electronic device 10, depicting a handheld electronic device, a tablet computing device, and a notebook computer, respectively.

Turning first to FIG. 1, the electronic device 10 may include, among other things, a display 12, input structures 14, input/output (I/O) ports 16, one or more processor(s) 18, memory 20, nonvolatile storage 22, a network interface 24, and a power source 26. The various functional blocks shown in FIG. 1 may include hardware elements (including circuitry), software elements (including computer code stored on a non-transitory computer-readable medium) or a combination of both hardware and software elements. It should be noted that FIG. 1 is merely one example of a particular implementation and is intended to illustrate the types of components that may be present in the electronic device 10. Indeed, the various depicted components (e.g., the processor(s) 18) may be separate components, components of a single contained module (e.g., a system-on-a-chip device), or may be incorporated wholly or partially within any of the other elements within the electronic device 10. The components depicted in FIG. 1 may be embodied wholly or in part as machine-readable instructions (e.g., software or firmware), hardware, or any combination thereof.

By way of example, the electronic device 10 may represent a block diagram of the handheld device depicted in FIG. 2, the tablet computing device depicted in FIG. 3, the notebook computer depicted in FIG. 4, or similar devices, such as desktop computers, televisions, and so forth. In the electronic device 10 of FIG. 1, the display 12 may be any suitable electronic display used to display image data (e.g., a liquid crystal display (LCD) or an organic light emitting diode (OLED) display). In some examples, the display 12 may represent one of the input structures 14, enabling users to interact with a user interface of the electronic device 10. In some embodiments, the electronic display 12 may be a MultiTouch™ display that can detect multiple touches at once. Other input structures 14 of the electronic device 10 may include buttons, keyboards, mice, trackpads, and the like. The I/O ports 16 may enable electronic device 10 to interface with various other electronic devices.

The processor(s) 18 and/or other data processing circuitry may execute instructions and/or operate on data stored in the memory 20 and/or nonvolatile storage 22. The memory 20 and the nonvolatile storage 22 may be any suitable articles of manufacture that include tangible, non-transitory computer-readable media to store the instructions or data, such as random-access memory, read-only memory, rewritable flash memory, hard drives, and optical discs. By way of example, a computer program product containing the instructions may include an operating system (e.g., OS X® or iOS by Apple Inc.) or an application program (e.g., Numbers®, Pages®, or Keynote® by Apple Inc.) or a suite of such application programs (e.g., iWork® by Apple Inc.).

The network interface 24 may include, for example, one or more interfaces for a personal area network (PAN), such as a Bluetooth network, for a local area network (LAN), such as an 802.11x Wi-Fi network, and/or for a wide area network (WAN), such as a 4G or LTE cellular network. The power source 26 of the electronic device 10 may be any suitable source of energy, such as a rechargeable lithium polymer (Li-poly) battery and/or an alternating current (AC) power converter.

As mentioned above, the electronic device 10 may take the form of a computer or other type of electronic device. Such computers may include computers that are generally portable (such as laptop, notebook, and tablet computers) as well as computers that are generally used in one place (such as conventional desktop computers, workstations and/or servers). FIG. 2 depicts a front view of a handheld device 10A, which represents one embodiment of the electronic device 10. The handheld device 10A may represent, for example, a portable phone, a media player, a personal data organizer, a handheld game platform, or any combination of such devices. By way of example, the handheld device 10A may be a model of an iPod® or iPhone® available from Apple Inc. of Cupertino, Calif.

The handheld device 10A may include an enclosure 28 to protect interior components from physical damage and to shield them from electromagnetic interference. The enclosure 28 may surround the display 12, which may display a graphical user interface (GUI) 30 having an array of icons 32. By way of example, one of the icons 32 may launch a spreadsheet application program (e.g., Numbers® by Apple Inc.), a presentation application program (e.g., Keynote® by Apple Inc.), or a word processing application program (e.g., Pages® by Apple Inc.). User input structures 14, in combination with the display 12, may allow a user to control the handheld device 10A. For example, the input structures 14 may activate or deactivate the handheld device 10A, navigate a user interface to a home screen, navigate a user interface to a user-configurable application screen, activate a voice-recognition feature, provide volume control, and toggle between vibrate and ring modes. Touchscreen features of the display 12 of the handheld device 10A may provide a simplified approach to controlling the spreadsheet application program. The handheld device 10A may include I/O ports 16 that open through the enclosure 28. These I/O ports 16 may include, for example, an audio jack and/or a Lightning® port from Apple Inc. to connect to external devices. The electronic device 10 may also be a tablet device 10B, as illustrated in FIG. 3. For example, the tablet device 10B may be a model of an iPad® available from Apple Inc.

In certain embodiments, the electronic device 10 may take the form of a computer, such as a model of a MacBook®, MacBook® Pro, MacBook Air®, iMac®, Mac® mini, or Mac Pro® available from Apple Inc. By way of example, the electronic device 10, taking the form of a notebook computer 10C, is illustrated in FIG. 4 in accordance with one embodiment of the present disclosure. The depicted computer 10C may include a display 12, input structures 14, I/O ports 16, and a housing 28. In one embodiment, the input structures 14 (e.g., a keyboard and/or touchpad) may be used to interact with the computer 10C, such as to start, control, or operate a GUI or applications (e.g., Numbers®, Pages®, or Keynote® by Apple Inc.) running on the computer 10C.

With the preceding in mind, a variety of computer program products, such as applications or operating systems, may use or implement the techniques discussed below to enhance the user experience on the electronic device 10. Indeed, any suitable computer program product that provides for the application of color or shading palettes to graphical structures displayed as part of a document or presentation, may employ some or all of the techniques discussed below. Though reference to color images, palettes, and graphic structures or objects are described herein by way of example and to facilitate explanation, it should be appreciated that the present approaches are also applicable in certain non-color contexts, such as for use with gray-scale images and palettes that may also be employed with graphical objects or structures. Likewise, while the following examples are provided in the context of a spreadsheet application, the present approaches are suitable for use in other applications (e.g., word processing applications, presentation applications, and so forth) where palettes are provided for user selection of a color or shading scheme to be applied to a composite graphical object or structure, such as a table, chart, graph, and so forth.

With the preceding in mind, an electronic device 10 may store and run a spreadsheet application 34 (e.g., Numbers® from Apple Inc.) or other suitable application. The application may be stored as one or more executable routines (which may encode and implement the actions described below) in memory and/or storage (FIG. 1). These routines, when executed, may cause control codes and logic as discussed herein to be implemented and may cause screens as discussed herein to be displayed on a screen of the electronic device or in communication with the electronic device.

Figure 5:
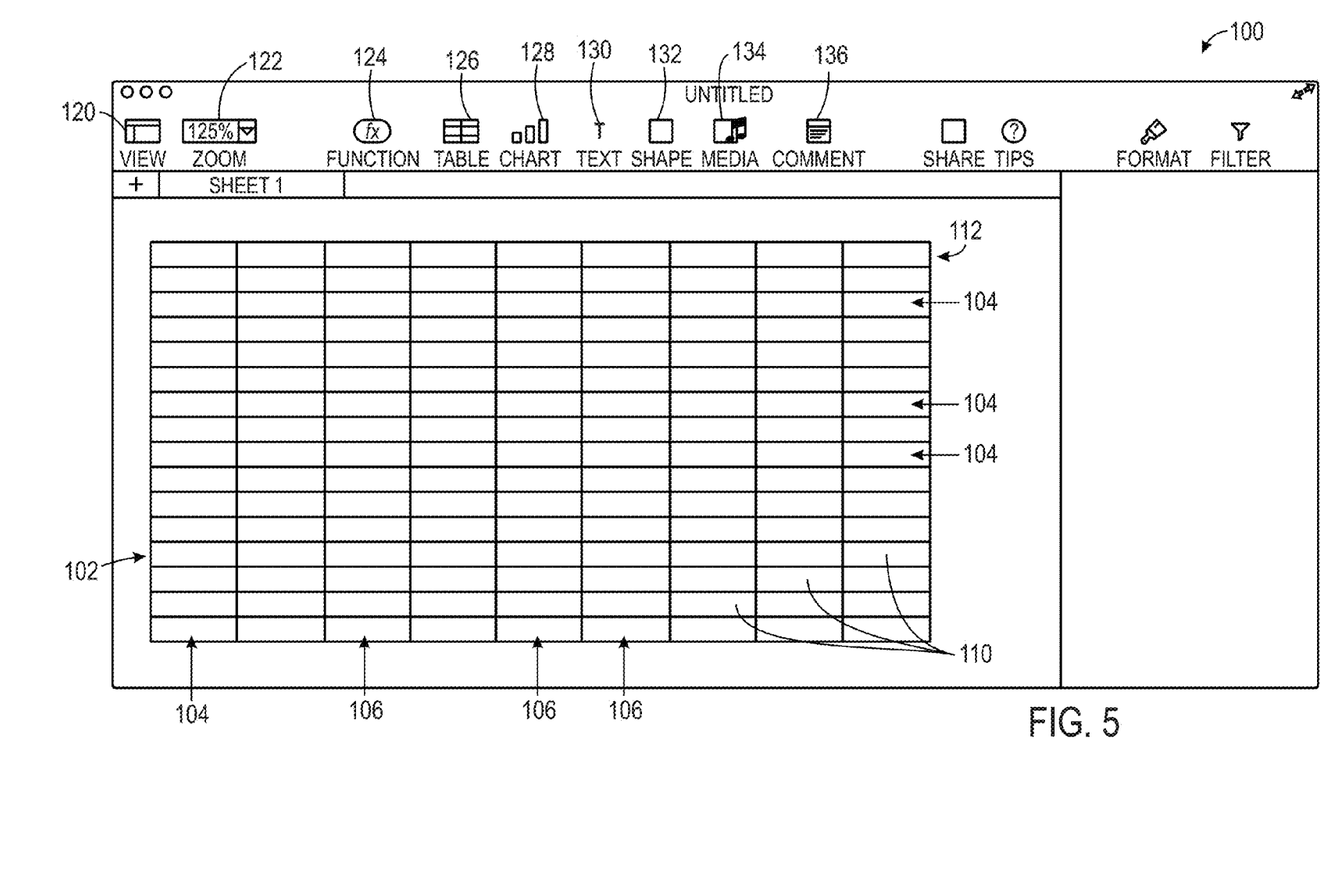
FIG. 5 illustrates an example of a screen of a spreadsheet application in accordance with aspects of the present disclosure.

Turning to FIG. 5, an example of a spreadsheet application interface screen 100 is depicted which includes a table 102 having rows 104 and columns 106 of cells 110. Upon selection of a cell 110 within the table 102, a user may be provided a prompt or other entry box by which text, numbers, formula, and so forth may be entered as the contents of a cell 110 or by which the existing contents of a cell 110 may be edited or modified.

In addition, the interface screen 100 may include an interface bar 120 that includes buttons, menus, drop down boxes, and so forth that a user may interact with to invoke various functions within the spreadsheet application. By way of example, in the depicted screen 100, a magnification control 122, function entry button 124, table button 126, chart button 128, text box button 130, shape button 132, media button 134, and comment button 136 are provided. By interacting with these various controls, the user may insert a new table (such as via selection of the table button 126), select a function for use in a cell (such as via selection of the function button 124), insert a comment (such as via selection of the comment button 136), and so forth). As will be appreciated, certain of these object are composite graphical constructs having various, different graphic components or regions that may be differently colored or shaded, as discussed herein, and may therefore benefit from the present approaches. For example, tables (e.g., table 102), charts and graphs, and shapes may have graphic components or regions that are differentially colored or shaded based on a user-generated palette, as discussed herein.

In the depicted example, the uppermost row(s) (i.e., header rows 112) and leftmost column(s) (i.e., header columns 114) may be provided and visually distinguished (i.e., differently colored or shaded) to allow this row and column to display row or column headings or labels. Similarly, other rows or columns maybe provided for specific display purposes. For example, one or more footer rows may also be provided in certain circumstances.

Figure 6:
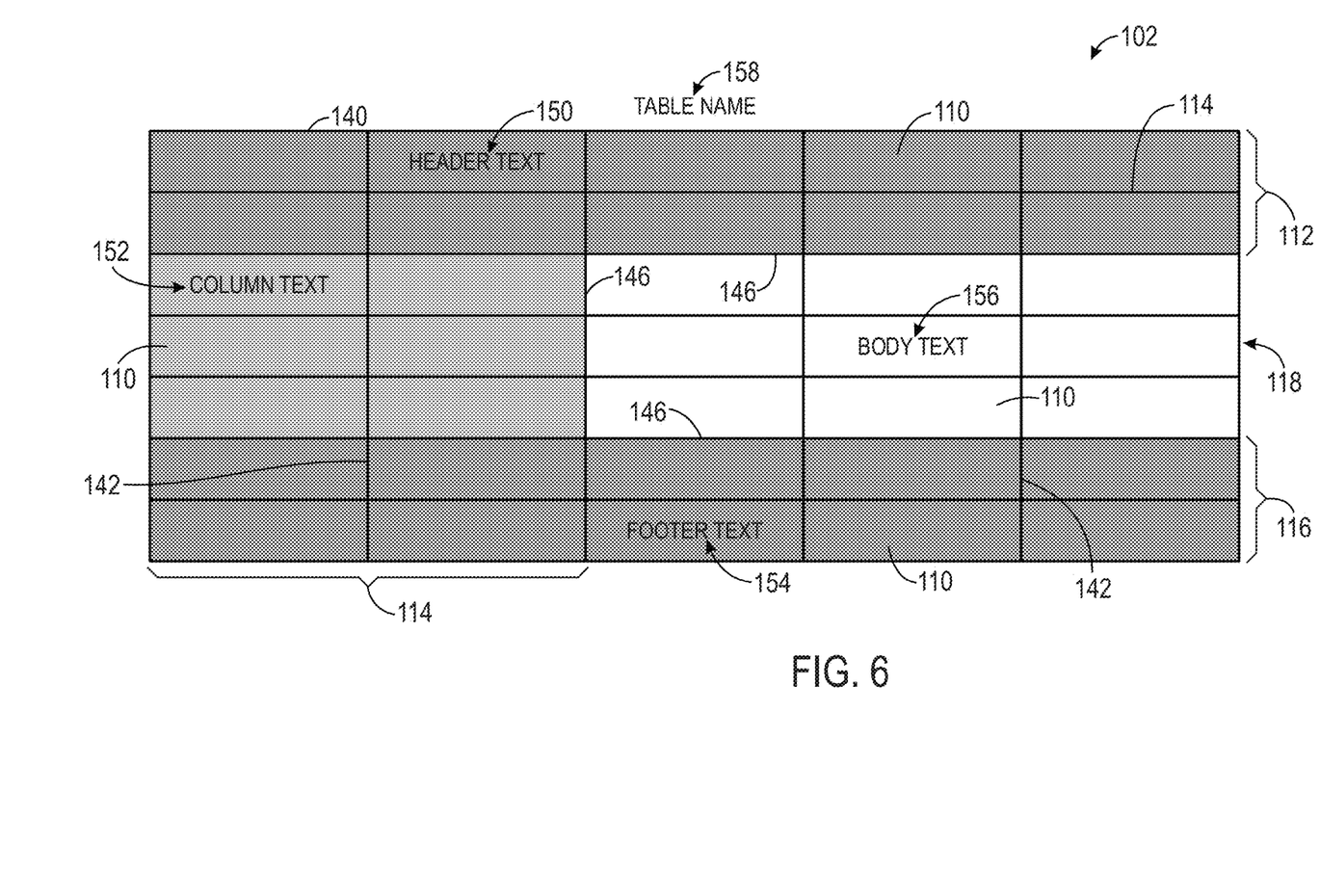
FIG. 6 depicts a generalized table having differentially colored or shaded regions and features, in accordance with aspects of the present disclosure.

By way of example, turning to FIG. 6, a portion of a table 102 is depicted having header rows 112, header columns 114, footer rows 116, and a table body 118 each composed of cells 110. The table 102 is delineated by a border 140 and a set of internal gridlines, such as vertical lines 142 and horizontal lines 144 that separate cells within any one of these regions, as well as separator lines 146 that may separate the header or footer rows or columns from the table body 118 or from each other. Further, any cell 110 of the header row 112, header column 114, footer row 116, or table body 118 may include text characters (e.g., alphanumeric characters, punctuation, mathematical operators, and so forth), such as the depicted header text 150, column text 152, footer text 154, body text 156, and table name 158. Thus, the depicted table 102 is a composite graphical construct in the sense that it is composed of different graphical components or pieces that may be individually or separately managed but which, taken together, form the graphical construct.

As will be appreciated, some or all of the various features described for the depicted table 102 may benefit from differential coloring or shading, such as using the colors of a palette having a number (e.g., two or more) of colors, with different colors of the palette being assigned to one or more distinct features of the table. For example, in the depicted table 102 the cells of the header rows 112 may be colored (i.e., filled) differently than the cells of one or more of the header columns 114, footer rows 116, or table body 118. Similarly, the cells of the header columns 114, footer rows 116, and table body 118 may be colored or shaded differently from one another. Likewise, depending on their position or significance, different text or lines of the table 102 may be presented in different colors of a selected palette.

More generally, with respect to a table, differential coloring may be employed: as a fill color for different cells (e.g., table header rows, table header columns, table footer rows, table body, or for alternating rows or columns (i.e., table body alternating rows or columns)); as a text color for different text (e.g., table header row text, table header column text, table footer row text, table body text, table name text); as a stroke color for different lines or separators (e.g., horizontal lines, vertical lines, separators, or borders for one or more of the table header row, table header columns, table footer row, or table body). Thus, a palette may be employed that provides different color or shading for each of these different table features or for some subset of these table features. Further, as will be appreciated, though a table 102 is used in this example, charts, graphs, shapes, and other graphical constructs may similarly include distinct features or components that may be differentially colored or shaded in accordance with the present approach.

As discussed herein, in accordance with certain embodiments one or more color palettes for use in customizing tables (such as table 102), chart, graphs, shapes, and other graphical constructs may be generated using an image selected by a user. In particular, one or more routines may be executed by a processor which analyze a provided image and generate one or more color palettes based on the colors found in the image. In this manner, a user may customize a table or chart (or other construct) to be visually coherent with the selected image.

Generation or application of the image-derived palettes may take into account various factors applicable to the graphical construct in question. For example, in the context of a table 102, it may be desirable for palette colors generated for use with text and line strokes to contrast with palette colors generated as a color fill for cells 110, thereby allowing the cells to be differentiated from one another and the various text characters to be read easily. Further, as will be appreciated from the preceding discussion, for composite constructs such as tables, graphs, and charts, there may be a large number of colors or shadings needed in the palette due to the number of separate and distinct features present in the construct. While, in general, not all colors used for the different features need to be unique, some degree of distinction is needed for many of the features. For instance, in the table example it may be desirable for header and footer sections to appear different than the table body section. Likewise, text and line strokes may need to be shown with sufficient contrast relative to the cell fill colors to be discernible. Similarly, if an alternating (e.g., banded) cell fill is employed, the banded fill body cells will need to appear different than the non-banded fill body cells.

With the preceding in mind, a variety of user interface approaches may be employed to facilitate user interactions for generating and selecting image-derived palettes as discussed herein. For example, in one implementation, menu options or selectable buttons may be provided, such as on the interface bar 120 of FIG. 5, which when selected allow a user to navigate to and select an image for generating a color palette to be applied to a graphical construct, such as table 102. As will be appreciated such navigation and selection may be implemented by opening or otherwise displaying navigation windows or panes from which a user may navigate to, locate, and select the desired image using keyboard, mouse, or touch screen controls. By way of example, a user may initially select a graphical construct to which a custom color scheme is to be applied (e.g., a target table, chart, or graph) and subsequently may select an option from a menu to apply a custom color scheme to the construct. Upon selection of the menu option, a navigation pane may be displayed which the user navigates to locate and select an image. Once the image is selected, a custom color palette may be generated based on the colors present in the image and the selected construct may be redrawn using the image-derived palette.

For example, a sample table 102 may include a variety of features, including a header row 112 having cells 110 displayed with a first fill color and having vertical line 142 separation between header row cells, text 150 within the header row cells, and a separator line 146 between the header row 112 and table body 118. Similarly, a header column is provided 114 having cells 110 displayed with a second fill color and having horizontal line 144 separation between header row cells, text 152 within the header column cells, and a separator line 126 between the header column 112 and table body 118.

In accordance with the preceding example, to provide a customized color scheme for the table 102, a user may select a custom colorization option, such as from a menu of options or as a button on an interface bar. Once such an option is selected, the user may navigate to an image that may be selected. Upon selection of the image, a palette may be automatically generated and applied to the table 102, resulting in the table 102 being redrawn using the colors of the image-derived palette for some or all of the different features of the table 102.

With respect to palette generation, in one implementation the application may execute one or more routines to analyze the color-based properties of the selected image (e.g., to determine what colors are present and in what amounts or to analyze and quantify properties of the colors present in the image, such as hue, chroma, saturation, lightness, brightness, luminance, and so forth). Based on these analyses, one or more color palettes are generated using the color present in the image or colors otherwise selected based on the color content of the image. By way of example, in instances where multiple palettes are generated based on the selected image, the different palettes may be generated so as to highlight different dominant colors from the source image, to focus on a more vivid set of colors than provided in other palettes or in the image, to focus on a lighter version of the colors present in another palette or in the image, and so forth.

Figure 7:
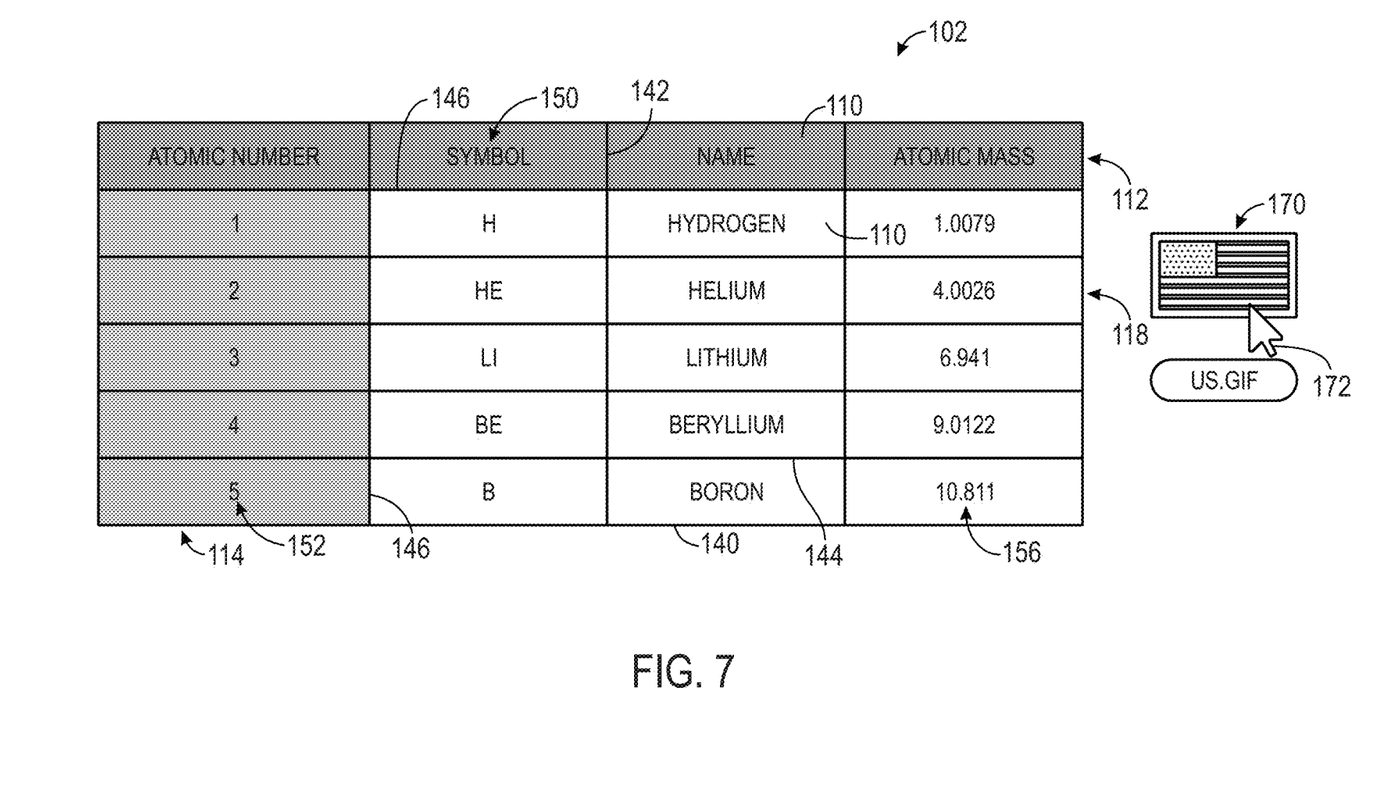
FIG. 7 depicts an example of a table and selected image, in accordance with aspects of the present disclosure.

While a menu or button based approach as discussed above is one possible implementation of a user interface for generating image-derived palettes, other interfaces may also be employed. For example, in one embodiment a drag- and drop type implementation may be employed. Turning to FIG. 7, in one embodiment a sample table is depicted that includes a table body 118 having no fill or a third color fill for the cells 110 within the table body 118, having horizontal and vertical lines 144, 142 defining the individual cells 110 of the body 118, and having text 156 within the table body cells. Thus, each of the features (e.g., text, line stokes, color fills) associated with different table regions (e.g., table body, header rows, header columns) may be assigned a unique color that is determined from a selected color palette or may share a color selected from such a palette with certain other features.

In this example, an image 170 (e.g., a color or grayscale image) may be selected by a user, as denoted by cursor arrow 172, for generation of one or more image-derived palettes for customizing the table 102. To facilitate explanation of this example, the image 170 is shown in conjunction with the sample table 102, though it should be appreciated that in a real world implementation, the image 170 may be present in a different screen or interface window, may be present merely as a file name as opposed to a displayed image or thumbnail, or may be selected and interacted with in other suitable manners, such as using a touch interface or menu based commands.

Figure 8:
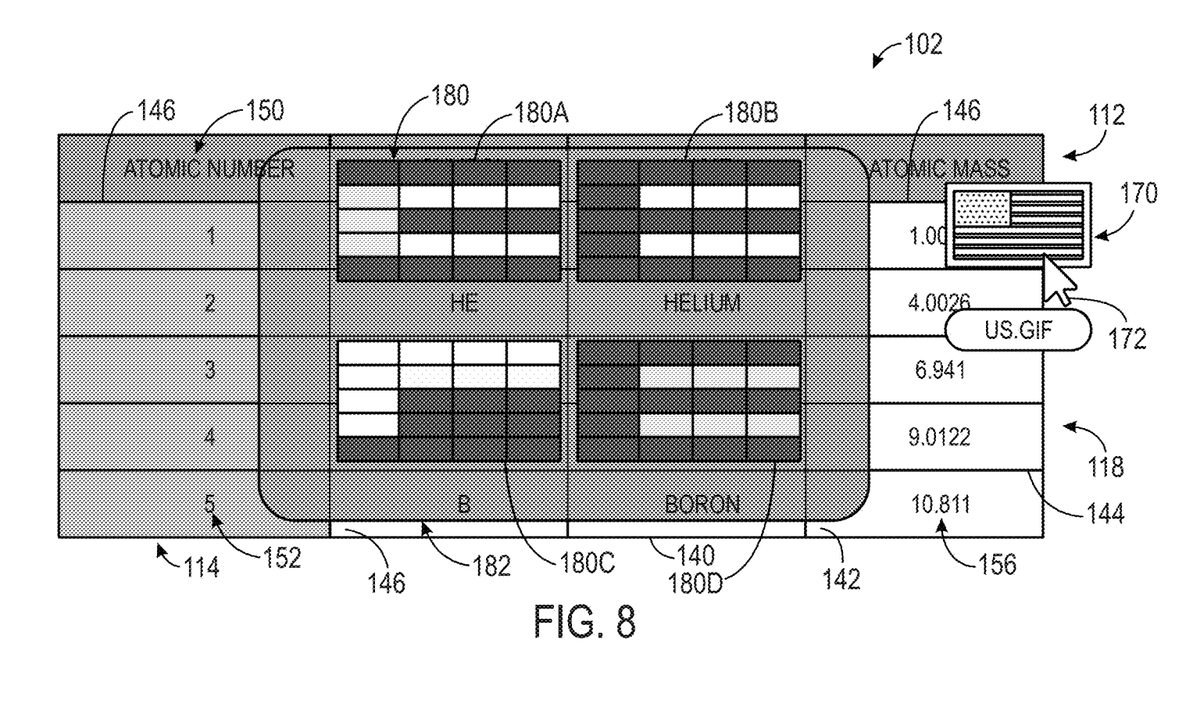
FIG. 8 depicts an example of a table with an overlay of image-derived palettes, in accordance with aspects of the present disclosure.

Turning to FIG. 8, in the depicted example a drag-and-drop implementation is shown in which dragging the selected image 170 over the sample table 102 to be customized causes generation and display of one or more image-derived palettes 180 (e.g., palettes 180*a*, 180*b*, 180*c*, 180*d*) generated based on the image 170. In one embodiment, to distinguish a drag-and-drop operation for generating palettes 180 with a drag-and-drop operation for simply repositioning the image 170 on the spreadsheet, a control key may be pressed during the operation to invoke the automatic palette generation routines when the image 170 is selected or is dragged over a suitable customizable construct, such as the table 102.

In the depicted example of FIG. 8, in a drag-and-drop implementation where multiple image-derived palettes 180 are generated based on the provided image 170 the multiple image-derived palettes may be displayed or otherwise shown to the user to allow user selection of a palette 180. For example, when the image 170 is dragged over the construct to be customized (e.g., table 102), an overlay interface element 182 of generated palettes 180 may be displayed over the construct, showing the various potential color schemes automatically generated based on the provided image 170. Selection of a particular image-derived palette 180 may then be accomplished by dropping the image 170 onto the selected palette 180 in this example. Upon selection of an image-derived palette 180 by the user, the palette color scheme may be applied to graphical construct (i.e., the construct may be redrawn using the selected palette colors assigned to the various features that form the construct).

While FIG. 8 depicts an example where multiple palettes are generated and displayed for user selection, in other drag-and-drop implementations a single image-derived palette 180 may instead be generated based on the analysis of the provided image 170. In such a single palette implementation, the automatically generated palette 180 may be applied to the composite graphical construct (e.g., table 102) when the image 170 is dragged over (such as while holding a specified control key) and then dropped on the construct to be customized. For example, turning to FIG. 7, such a single palette implementation may be accomplished by the user dragging the image 170 over the table 102 (such as while holding a control key down) and dropping the image 170 onto the table 102. In response to these actions, the application automatically generates an image-derived palette and applies the image-derived palette to the graphical construct in question in response to the image 170 being dropped on the construct. The graphical construct may then be redrawn using the colors of the palette assigned to the various different respective features of the construct, such as cell fills for different regions, different line stroke colors, different text colors, and so forth.

Figure 9:
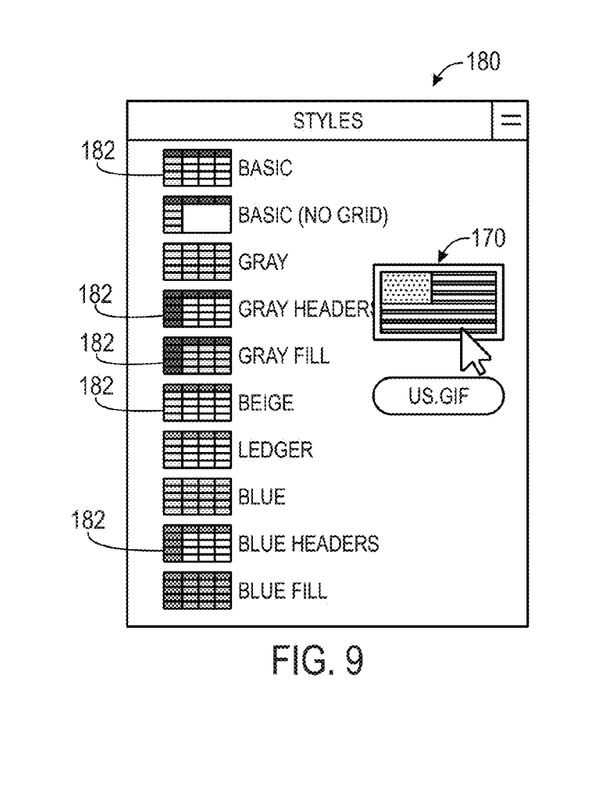
FIG. 9 depicts an example of a style menu having preset palettes.
Figure 10:
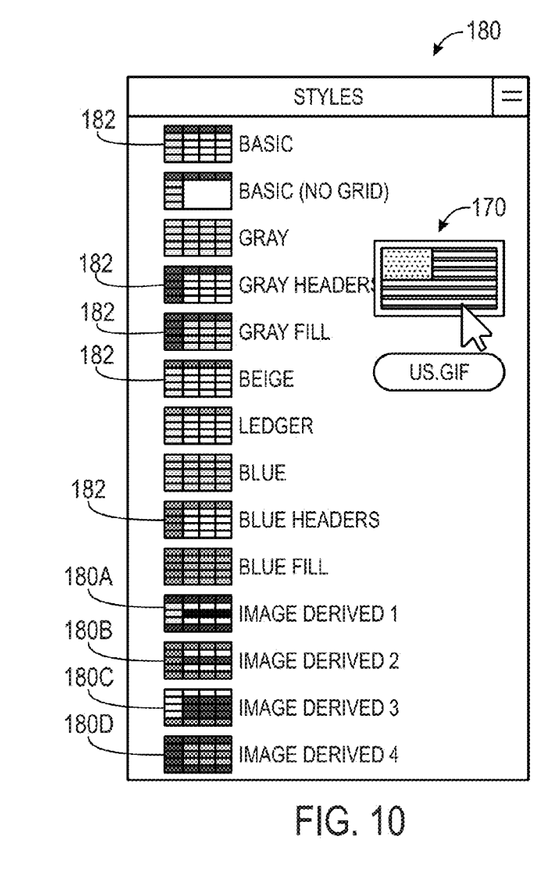
FIG. 10 depicts an example of a style menu depicting both preset palettes and image-derived palettes, in accordance with aspects of the present disclosure.

In yet another implementation, one or more image analyzed color palettes may be generated in response to the user dragging the selected image 170 onto an existing (e.g., pre-set) palette panel or selection, thereby indicating that the selected image is to be used to generate one or more additional palettes. For example, turning to FIG. 9, a style panel 180 is displayed that may be invoked by selection of a menu option or a button of a button interface. In the depicted example, the style panel 180 displays a list of selectable, pre-set palettes 182. Turning to FIG. 10, by dragging the selected image 170 onto or over the style panel 180, routines may be invoked to generate additional palettes, i.e., image-derived palettes 180, based on the image 170. The image-derived palettes 180 may then be added to the listed palettes or otherwise presented to the user for potential selection. The user may then select a palette from the listed palettes to apply to a selected graphical construct, such as table 102.

The preceding discussion relates a variety of suitable user interface approaches for allowing a user to generate and use a palette derived from an image provide by the user. However, it should be appreciated that other suitable interface designs may instead be employed while still falling within the scope of the present discussion.

Figure 12:
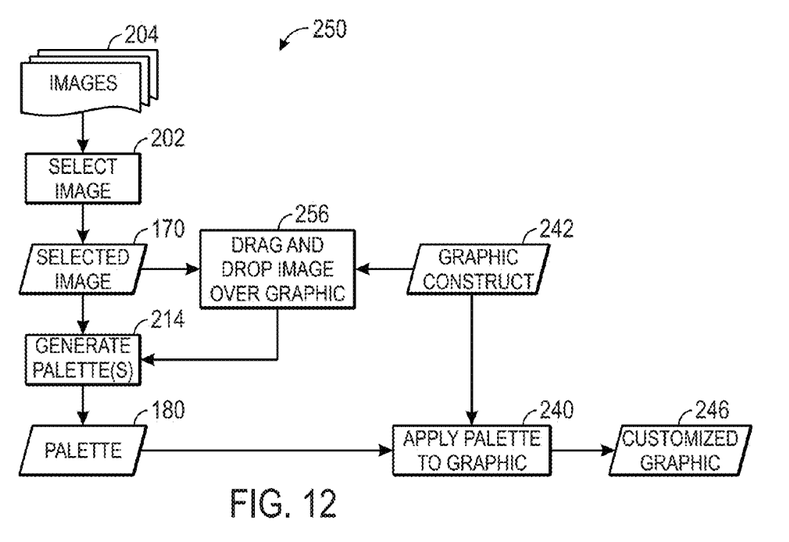
FIG. 12 depicts a process flow depicting control logic for implementing a further embodiment of the present disclosure.
Figure 13:
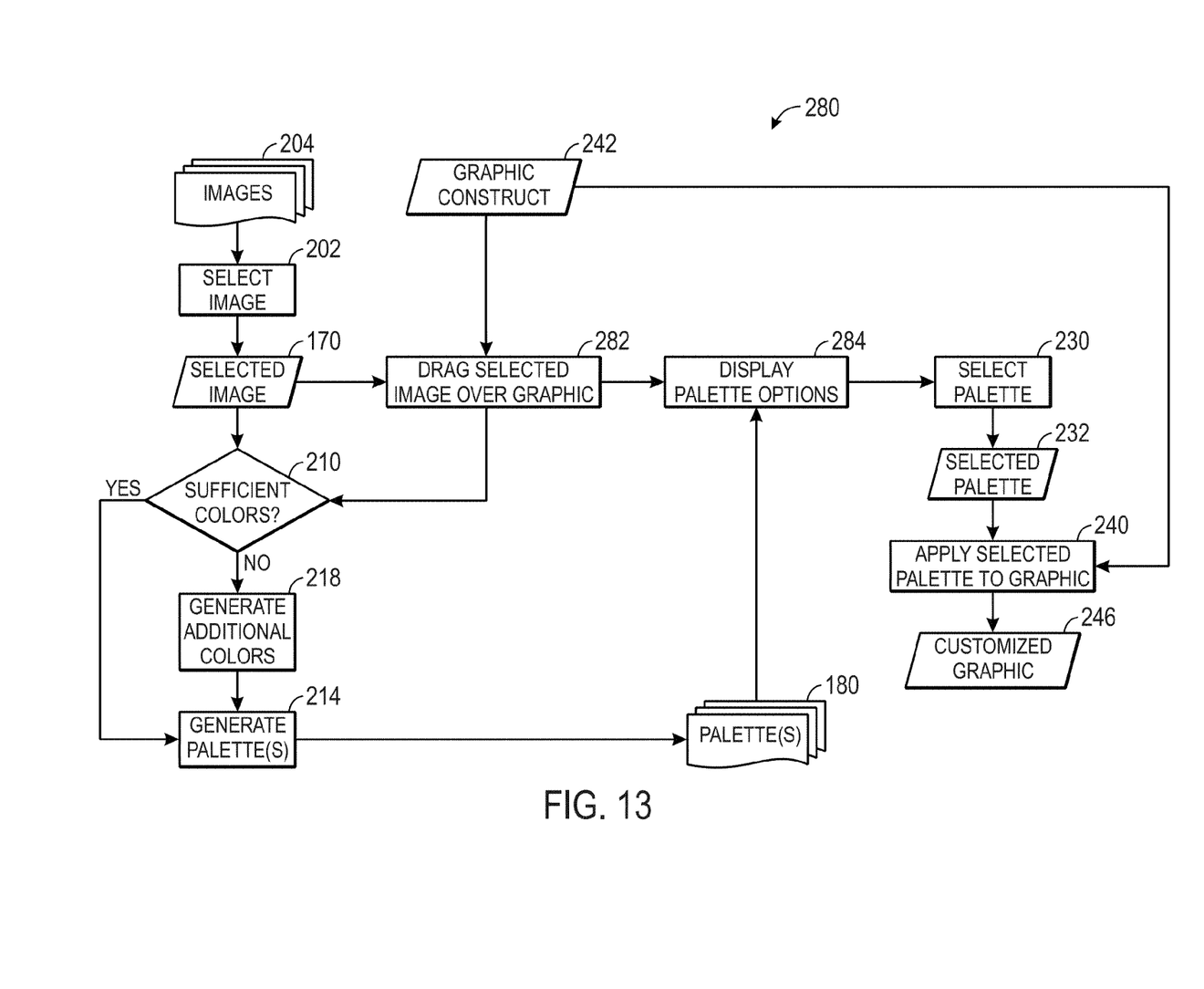
FIG. 13 depicts a process flow depicting control logic for implementing an additional embodiment of the present disclosure.

Regardless of the user-interface approach employed, as discussed herein the generation of palettes based on a user provided image is described. Examples of steps that may be employed in such palette generation algorithms are described in FIGS. 11-13. In particular, FIGS. 11-13 depict process flow diagrams describing the generation and application of such palettes.

Figure 11:
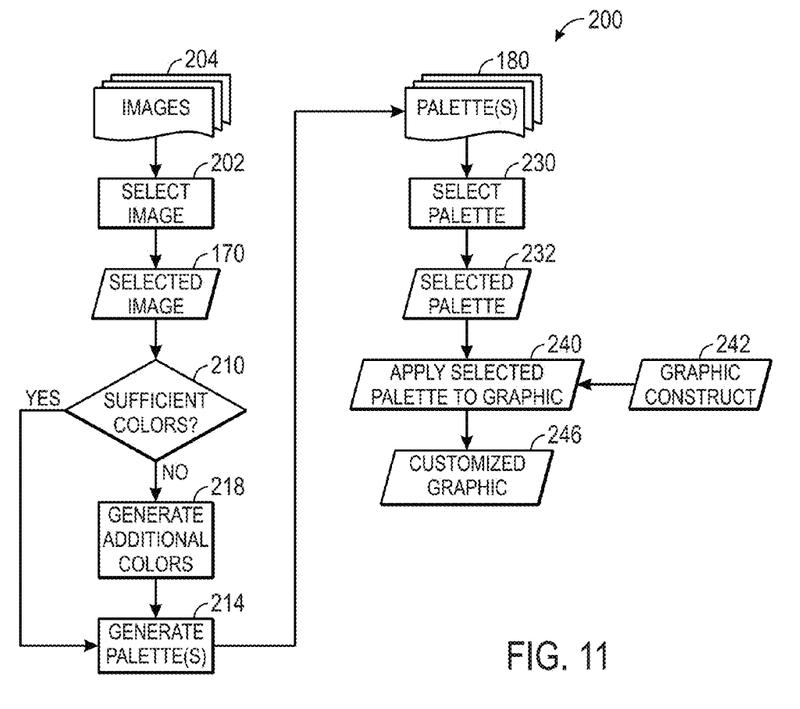
FIG. 11 depicts a process flow depicting control logic for implementing an embodiment of the present disclosure.

For example, turning to FIG. 11, one example of a palette generation algorithm 200 is described by way of a process-flow diagram. In accordance with this approach, an image 170 is selected (block 202) by a user. In certain circumstances, the image 170 may be selected from among a larger set 204 of images.

As noted above, the number of colors needed in the palette may be quite large due to the number of distinct features within the graphical construct (e.g., table, graph, chart, and so forth) to be customized. Therefore, in some circumstances the selected image 170 may not contain sufficient color distinctions (such as due to being too monochromatic) to allow generation of a palette solely using colors present in the image 170. Such a determination is depicted in the algorithm 200 at decision block 210. If the image 170 is determined to include a sufficient number of colors to allow palette generation (block 214) to proceed using only the colors present in the image 170, one or more palettes 180 are generated using the colors present in the image 170.

Conversely, if it is determined that the image 170 does not include a sufficient number of colors to populate the desired palettes 180, the palette generation process may generate (block 218) additional colors that do not appear in the selected image 170 for inclusion in one or more of the palettes 180. In particular, in one implementation, additional colors are added which are determined to be suitable (e.g., visually or aesthetically pleasing) with respect to the dominant colors identified within the image 170. For example, in one implementation, additional colors may be added that differ in hue from one or more of the dominant colors in the image 170, but which share the same luminance as other colors in the generated palette(s) 180. Thus, in the depicted example, one or more palettes 180 may be created based on the selected image 170, but which may contain additional colors not found in the image 170 if that image does not contain a sufficient number of colors to fully populate the palettes 180.

Once generated, the image-derived palettes 180 may be displayed or otherwise presented to a user, allowing the user to select (block 230) an image-derived palette 232 for application (block 240) to a graphic construct 242 having various features that may be differently colored or shaded with respect to one another. As will be appreciated, if only one image-derived palette 180 is generated, the palette selection step may be omitted and the single image-derived palette 180 may be automatically applied. Upon application of the selected palette 232 to the graphic construct 242, the graphic may be customized (i.e., customized graphic 246) so as to be coherent with (or otherwise colored in accordance with) image 170 selected by the user.

While FIG. 11 describes a generalized process-flow, FIG. 12 depicts the steps of an algorithm 250 directed to a drag-and-drop implementation as discussed herein. In the example of FIG. 12, an image 170 is selected (block 202), such as from a set 204 of images. In the depicted implementation, a single palette 180 is generated (block 214) based on the image 170. In particular, in this example, the palette 180 may be generated (block 214) in response to the selected image 170 being dragged-and-dropped over (block 256) the graphic construct 242 to be customized, such as while a control key is actuated to invoke the image-derived palette generation routines. Because a single palette 180 is generated in this example, the resulting image-derived palette 180 may be automatically applied (block 240) to the graphic construct 242 to generate the customized graphic 246.

Turning to FIG. 12, a further example of an algorithm 280 is depicted showing a drag-and-drop implementation combined with the generation of multiple image-derived palettes 180. In this example, as in the preceding examples, an image 170 is selected (block 202) by the user. The selected image 170 is dragged over the graphic construct 242 to be customized to invoke the palette generation process (block 214). As part of the palette generation process, a determination (block 210) may be made as to whether the selected image 170 includes sufficient colors to generate the desired palettes 180, with additional colors being generated (block 218) if needed.

In the depicted example, once generated, the palettes 180 may be displayed (block 284), such as in conjunction with the graphic 242, to allow a user to select (block 230) a palette 232 from among the generated image-derived palettes 180. The selected palette 232 may then be applied 240 to the graphic construct 242 to generate the customized graphic 246.

As described in the preceding, non-limiting examples, the present approaches facilitate the automatic generation of custom palettes based on an image selected by a user. In various embodiments, such automatic generation may involve deriving one or more than one palette based on the color or shading content of the image. In general, the different colors present in the automatically generated palettes can be automatically mapped to and applied to various distinct features within a composite graphic construct to be customized, such as to automatically apply the palette colors to the fill, line strokes, or text of such constructs. Examples of such constructs include, but are not limited to, tables, charts, graphs, and shapes that may be placed in a document and which may be constructed using multiple distinct component graphics to form the whole. In this manner, a user may assign a color scheme to a composite graphic construct that is consistent with and coherent with the selected image.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A method for generating a palette using an electronic processor, comprising:
    receiving an image as an input to the electronic processor;
    analyzing the image using the electronic processor to determine the color content of the image prior to generating a custom palette;
    generating the custom palette based upon the color content of the image using the electronic processor, wherein generating the custom palette comprises generating one or more additional colors not substantially present in the image for inclusion in the custom palette; and
    applying the custom palette to a graphic construct comprising a plurality of discrete graphic features using the electronic processor, wherein at least two of the discrete graphic features are differentially colored using colors of the custom palette.

2. The method of claim 1, wherein the custom palette includes colors present in the image and colors not present in the image.

3. The method of claim 1, wherein the graphic construct comprises a table, a chart, or a graph.

4. The method of claim 1, wherein the plurality of discrete graphic features comprises one or more fill colors, one or more line stroke colors, one or more text colors, or any combination thereof.

5. A non-transitory, tangible computer-readable medium, comprising:
    processor-executable routines, wherein the routines, when executed by an electronic processor, cause the electronic processor to:
        generate a plurality of palettes based on a selected image;
        facilitate the plurality of palettes to be displayed, wherein facilitating the plurality of palettes to be displayed comprises one or both of: displaying an overlay of the plurality of palettes in conjunction with a graphic construct or displaying a list of palettes that includes the plurality of palettes generated based on the selected image;
        receive a selection of a palette of the plurality of palettes; and
        draw the graphic construct using a plurality of colors or shadings present in the selected palette.

6. The non-transitory, tangible computer-readable medium of claim 5, wherein the routines, when executed by the electronic processor, cause the electronic processor to analyze the selected image to determine one or more visual properties of the selected image, and wherein the plurality of palettes are generated based on the one or more visual properties.

7. The non-transitory, tangible computer-readable medium of claim 5, wherein the routines, when executed by the electronic processor, cause the electronic processor to redraw a table, a chart, a graph, or a shape, as the graphic construct.

8. A processor-based system, comprising:
    a display;
    a memory storing one or more routines; and
    a processing component configured to execute the one or more routines stored in the memory, wherein the one or more routines, when executed by the processing component, cause acts to be performed comprising:
        receiving an indication of a selected image;
        analyzing the selected image to determine one or more color properties of the selected image;
        based on the one or more color properties of the selected image, generating at least one image-derived palette, wherein the at least one image-derived palette comprises colors not substantially present in the selected image; and
        drawing a composite graphic on the display using the at least one image-derived palette.

9. The processor-based system of claim 8, wherein receiving the indication of the selected image comprises receiving a user input comprising dragging the selected image over the composite graphic or over a list of available palettes.

10. The processor-based system of claim 8, wherein the one or more routines, when executed by the processing component, cause acts to be performed further comprising:
    determining one or more additional colors based on the one or more color properties of the selected image;
    wherein the at least one image-derived palette comprises the one or more additional colors.

11. The processor-based system of claim 8, wherein the composite graphic comprises a plurality of features, and wherein each of the plurality of features comprises an assigned color from the at least one image-derived palette when the composite graphic is drawn.

12. The processor-based system of claim 8, wherein the composite graphic comprises a table, a chart, a graph, or a shape.

13. A method for generating a palette using an electronic processor of an electronic device, comprising:
    receiving a first input to the electronic processor, wherein the first input comprises an input to drag an image over a composite graphic displayed on an electronic display of the electronic device;
    generating an image-derived palette in response to the first input using the electronic processor, wherein the image-derived palette is automatically generated to comprise multiple colors present in the image;

receiving a second input to the electronic processor, wherein the second input comprises an input to drop the image on the composite graphic; and applying the image-derived palette to the composite graphic in response to the second input using the electronic processor, such that different components of the composite graphic are each colored with different colors of the image-derived palette.

14. The method of claim 13, wherein the first input comprises an additional input of a control key being pressed.

15. The method of claim 13, wherein the image-derived palette comprises only colors present in the image.

16. The method of claim 13, wherein the image-derived palette comprises the multiple colors present in the image and additional colors.

17. A method for generating a palette using an electronic processor of an electronic device, comprising:

receiving a drag input to the electronic processor corresponding to a selected image being dragged over an interface element displayed on an electronic display of the electronic device;

generating a plurality of image-derived palettes using the electronic processor in response to the drag input;

displaying or listing the plurality of image-derived palettes on the electronic display using the electronic processor;

receiving a selection input to the electronic processor corresponding to selection of one of the plurality of image-derived palettes; and applying the selected one of the plurality of image-derived palettes to a graphic displayed on the electronic display using the electronic processor.

18. The method of claim 17, further comprising:

receiving a modifier input contemporaneous with the drag input, wherein the modifier input corresponds to a control key being pressed.

19. The method of claim 17, wherein the interface element comprises a list of available palettes.

20. The method of claim 17, wherein the interface element comprises the graphic.

* * * * *